United States Patent Office 3,401,014
Patented Sept. 10, 1968

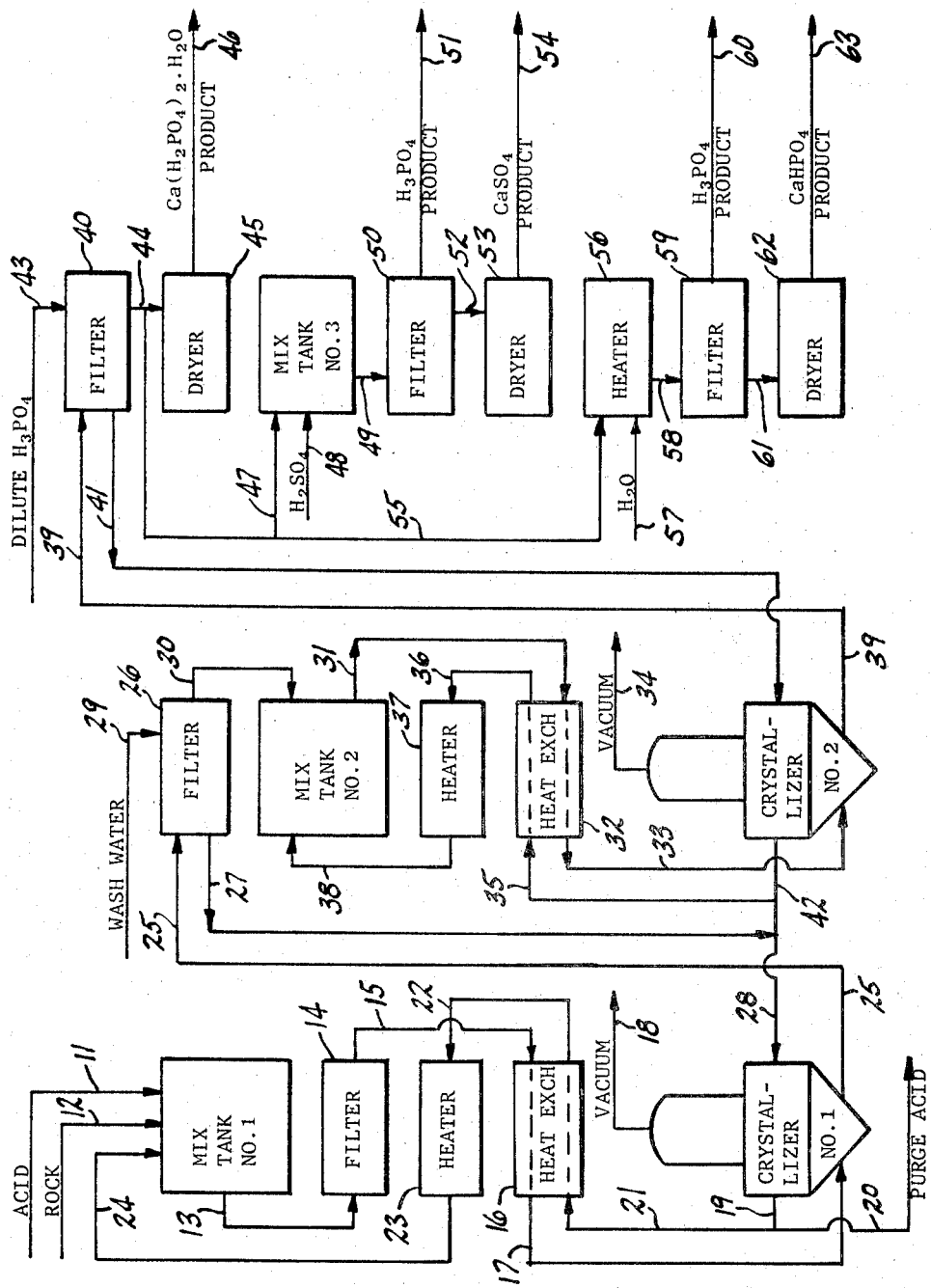

3,401,014
PREPARATION OF PURE MONOCALCIUM
PHOSPHATE
Walter C. Saeman, Orange, Conn., assignor to Olin
Mathieson Chemical Corporation
Filed Nov. 26, 1965, Ser. No. 509,961
4 Claims. (Cl. 23—109)

ABSTRACT OF THE DISCLOSURE

Pure monocalcium phosphate is prepared from impure phosphoric acid and phosphate rock or other lime source by forming monocalcium phosphate in solution, crystallizing to produce a liquor containing coarse crystals of monocalcium phosphate and suspended impurities in finely divided form, elutriating hydraulically to separate said coarse crystals from said finely divided impurities and recovering the thus purified monocalcium phosphate. The latter is also converted further to pure dicalcium phosphate or pure phosphoric acid.

---

This invention relates to an improved process for purifying wet process phosphoric acid. The improved process further provides means for producing calcium acid phosphates of the formulas $Ca(H_2PO_4)_2 \cdot H_2O$ and $$Ca(H_2PO_4)_2$$

and $CaHPO_4$ and calcium sulfate in purified forms suitable for food grade and other uses from the impure wet process phosphoric acid.

Wet process acid is made by reacting phosphate rock with sulfuric acid. The calcium phosphate of the rock is converted to calcium sulfate and phosphoric acid:

$$Ca_3(PO_4)_2 + 3H_2SO_4 \longrightarrow 3CaSO_4 + 2H_3PO_4 \qquad (I)$$

Calcium sulfate, containing insoluble and precipitated impurities from the rock, for example, silica, are removed by filtration or other appropriate separation means. The phosphoric acid contains soluble impurities, particularly fluorides, iron and aluminum sulfates. For the manufacture of superphosphate and for other fertilizer uses, these impurities can be tolerated and are not separated from the acid. For the manufacture of sodium phosphates and products where the acid is neutralized, the impurities are largely precipitated and separated and pure products are formed. Where the more acidic phosphates and the pure acid are required, purification can not be effected economically in this way.

The process of this invention is applicable generally to phosphoric acid from various sources, but it is of particular economic significance in purifying the so-called "wet process acid" obtained by reacting sulfuric acid with phosphate rock to remove the large proportions of impurities, including Fe, Al, Si, F, S, present in the acid.

The process of this invention comprises adding a lime source material to impure phosphoric acid to form a first liquor containing dissolved monocalcium phosphate, crystallizing said monocalcium phosphate to form a mixture of coarse crystals of monocalcium phosphate in a second liquor, elutriating hydraulically to separate said coarse crystals from said second liquor and from impurities dissolved in and suspended in finely divided form in said second liquor. When the pure orthophosphate product desired is phosphoric acid, the separated coarse crystals of monocalcium phosphate are reacted with sulfuric acid to form a slurry of precipitated calcium sulfate in phosphoric acid and separating the precipitated calcium sulfate to produce purified phosphoric acid.

Suitable lime source materials are those more alkaline than monocalcium phosphate and include, for example, quicklime, hydrated lime, $Ca(OH)_2$, limestone, $CaCO_3$, dicalcium phosphate, $CaHPO_4$, and tricalcium phosphate, $Ca_3(PO_4)_2$, including impure forms thereof, for example, phosphate rock.

The ratio of acid to lime source material in the feed streams is controlled to provide a molar ratio of $CaO:P_2O_5$ of substantially 1:1 plus sufficient acid to make up the amount of $P_2O_5$ contained in the impure acid purged from the system. An excess of acid in the crystallization step is required to produce monocalcium phosphate as shown in the solubility diagram of Elmore and Farr, Ind. Eng. Chem., 32, 580 (1940). Suitably the ratio of $P_2O_5$ to CaO in the crystallization is, for example, from 5:1 to 60:1 at about 125° F.

The monocalcium phosphate formed by partial neutralization has the formula $Ca(H_2PO_4)_2 \cdot H_2O$ or $$Ca(H_2PO_4)_2$$

It is crystallized under turbulent suspension conditions to form coarse crystals, while maintaining impurities in solution or suspended in finely divided form in the mother liquor. The coarse crystals are separated from the liquor by any suitable means, usually by centrifuging or filtering and washed to produce purified monocalcium phosphate. It is dried when this is the desired product.

A surprising result of this process is that purified crystals of $Ca(H_2PO_4)_2 \cdot H_2O$ can be grown in a mother liquor which is enriched in impurities, dissolved and suspended in finely divided form and that such purified crystals can be grown to a sufficent size to permit separation of the impurities by hydraulic elutriation.

It is important in the process of this invention to produce the monocalcium phosphate in coarse crystalline form. $Ca(H_2PO_4)_2 \cdot H_2O$ normally precipitates as small, thin, flaky crystals at saturation. It is not possible economically to separate and wash the impure mother liquor from the crystals. By the process of turbulent suspension crystallization, $Ca(H_2PO_4)_2 \cdot H_2O$ is crystallized from super-saturated solutions in coarse crystalline form. The mother liquor is easily separated from the crystals by any suitable means, for example, by sedimentation, filtration or centrifugation. The soluble and the finely divided impurities in the liquor wash freely through the interstices of the coarse crystals thereby affording a simple and practical method for physical separation of the impurities. Alternatively, the difference in sedimentation rates of the coarse $Ca(H_2PO_4)_2 \cdot H_2O$ crystals and the finely divided impurities in the "wet acid" also constitutes a practiced method for physical separation. In practice, the $Ca(H_2PO_4)_2 \cdot H_2O$ crystals are grown to a size of 0.5 mm. or more in their greatest dimension. Their sedimentation rates are then so much faster than that of the suspended impurities that physical separation of the crystals from the finely divided impurities are readily made.

The turbulent suspension crystallization method, in addition to producing larger crystals than other methods, also produces purer crystals. An excess of crystal nuclei or seed tend to diminish the average size of the product crystals. Both such seed crystals as well as finely divided precipitated impurities are continuously separated and withdrawn from the larger sized crystals by hydraulic elutriation. The crystal nuclei are redissolved by heating them with solvent, mother liquor, or by injection of excess solvent. Residual impurities are suitably removed, for example, by settling or filtration. The clarified solution containing the redissolved excess nuclei or seed is returned to the crystallizer for further cooling and/or concentration. In practice, the concentration of impurities in the crystallizer mother-liquor increases until the rate of removal as purge equals the rate of introduction in the feed.

Product crystals containing impure mother liquor entrapped in interstices are also removed at a rate equal to the yield of $Ca(H_2PO_4)_2 \cdot H_2O$. The entrapped impurities easily wash through the interstices in the coarse crystals and are separated by successive mixing and settling with an appropriate wash liquor, for example, $H_3PO_4$, water or alcohol.

When the monocalcium phosphate is desired in a further purified form, for example, for use in the manufacture of pure phosphoric acid, the separated and washed crystals are redissolved in aqueous phosphoric acid and recrystallized therefrom again under turbulent suspension conditions to form coarse crystals of monocalcium phosphate. A portion of the mother liquor is purged to the preceding crystallization stage to limit the accumulation of impurities. The recrystallized coarse crystals are separated from the liquor by any suitable means.

If crystals of still higher purity are required, the product is redissolved in a pure solvent and recrystallized again. As many additional stages of recrystallization are contemplated as are required to attain the degree of purity desired.

In the recrystallization process, the coarse crystals of monocalcium phosphate are dissolved in aqueous phosphoric acid to form a third liquor containing dissolved monocalcium phosphate, crystallizing said monocalcium phosphate to form a mixture of coarse crystals of monocalcium phosphate in a fourth liquor, elutriating hydraulically to separate said coarse crystals from said fourth liquor and from impurities dissolved in and suspended in finely divided form in said fourth liquor.

In conjunction with the hydraulic elutriation to separate impurities and undesired crystal nuclei from the desired coarse crystals, it is advantageous to recycle to the crystallizer a small proportion, suitably from 1 to 5 percent of the coarse crystals produced in the process. The coarse crystals grow larger at the expense of the finer crystal nuclei and prevent initiation of growth of smaller crystals.

For the purposes of this invention, crystallizers of the turbulent suspension type are suitable, for example, crystallizers of the type shown in U.S. Patents 2,737,451; 2,827,366; 2,856,270 and 2,883,273.

The monocalcium phosphate crystals, dry or wet, either as first crystallized or as recrystallized, are mixed with sulfuric acid and converted to a slurry of precipitated calcium sulfate in phosphoric acid. The calcium sulfate is separated by any suitable means, for example, centrifuging or filtering, to produce calcium sulfate in pure form. The purified phosphoric acid filtrate is suitable for food grade or other uses.

In the partial neutralization of the impure acid, monocalcium phosphate is formed by one or more of the following equations:

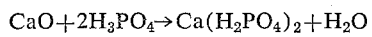
$$CaO + 2H_3PO_4 \rightarrow Ca(H_2PO_4)_2 + H_2O \quad (II)$$

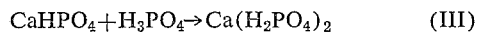
$$CaHPO_4 + H_3PO_4 \rightarrow Ca(H_2PO_4)_2 \quad (III)$$

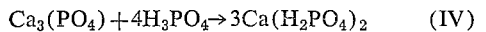
$$Ca_3(PO_4)_2 + 4H_3PO_4 \rightarrow 3Ca(H_2PO_4)_2 \quad (IV)$$

The purified monocalcium phosphate is regenerated to pure phosphoric acid by the process of the equation:

$$Ca(H_2PO_4)_2 + H_2SO_4 \rightarrow CaSO_4 + 2H_3PO_4 \quad (V)$$

When dicalcium phosphate is the desired product, it is formed by thermal dissociation of the monocalcium phosphate in solution:

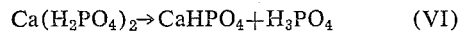
$$Ca(H_2PO_4)_2 \rightarrow CaHPO_4 + H_3PO_4 \quad (VI)$$

Equation I shows that in the known wet process for the manufacture of phosphoric acid, 3 moles of $H_2SO_4$ are required to produce 2 moles of $H_3PO_4$. A summation of Equations I, IV and V, representing the chemical changes when the process of this invention is used to manufacture purified phosphoric acid from the impure acid first produced, shows the same ratio of 3 moles of $H_2SO_4$ used to 2 moles of $H_3PO_4$ produced. No more acid is used in proportion to rock charged in the process of this invention than is used in the known process. However, the acid is used in an improved manner which results in the production of pure $H_3PO_4$ instead of impure $H_3PO_4$ and the by-product $CaSO_4$ is pure instead of impure. The increased economic value of these products more than pays for increased processing costs. When $CaHPO_4$ is the desired product, the summation of Equations I, IV and VI shows a ratio of 1 mole of $H_2SO_4$ used for each mole of orthophosphate products whereas the prior art process, represented by Equation I, requires $3H_2SO_4$ to produce 2 moles of orthophosphate product. This is obviously an economic advantage of the present process over the prior art process.

The figure herewith illustrates the process of the invention as it is operated to produce either $Ca(H_2PO_4)_2 \cdot H_2O$ or $CaHPO_4$ as the principal product or to produce pure phosphoric acid as the principal product and pure calcium sulfate as the byproduct. Impure phosphoric acid is introduced into mix tank No. 1 via line 11 and phosphate rock or other lime source material is introduced via line 12. Reaction occurs in mix tank No. 1 at a temperature of about 150 to 200° F. and the mixture flows via line 13 to filter 14 to remove unreacted and insoluble materials. The filtrate is passed via line 15 through heat exchanger 16 to cool the solution as it is introduced via line 17 into the lower part of crystallizer No. 1.

Water is removed from crystallizer No. 1 by a vacuum applied by line 18. Liquor containing suspended finely divided impurities is removed from crystallizer No. 1 via line 19 and purge acid is discharged via line 20. The main stream of liquor passes via line 21 through heat exchanger 16 countercurrent to the flow of hot filtrate. The liquor is transferred via line 22 through heater 23 and brought to the temperature of the contents of mix tank No. 1 into which it is discharged via line 24.

From the bottom of crystallizer No. 1 is withdrawn via line 25 a slurry of liquor and coarse crystals of monocalcium phosphate. The slurry is separated in filter 26 and the liquor is returned via lines 27 and 28 to crystallizer No. 1. The crystals are washed on the filter by the water introduced via line 29 and the washed crystals are transferred via line 30 to mix tank No. 2. The crystals are dissolved in mix tank No. 2 in the liquor from crystallizer No. 2. The thus enriched liquor is transferred via line 31 through heat exchanger 32 and via line 33 to the bottom of crystallizer No. 2. Water is removed from crystallizer No. 2 by a vacuum applied by line 34. Liquor containing suspended finely divided impurities is removed from crystallizer No. 2 via line 35. It is heated by passage through heat exchanger 32 countercurrent to the flow of liquor from mix tank No. 2. The heated liquor is transferred via line 36 to heater 37 where it is brought to the temperature of the contents of mix tank No. 2 into which it is transferred via line 38.

A slurry of coarse crystals is removed from crystallizer No. 2 via line 39 and separated in filter 40. Liquor is returned to crystallizer No. 2 via line 41. Excess liquor in crystallizer No. 2 is removed and transferred via lines 42 and 28 to crystallizer No. 1. The crystals on filter 40 are washed with dilute $H_3PO_4$ from line 43. The crystals are transferred via line 44 to dryer 45 and removed as product via line 46.

When the process is operated to produce pure phosphoric acid and calcium sulfate as products, the monocalcium phosphate is transferred via line 47 to mix tank No. 3. It is there reacted with sulfuric acid introduced via line 48. The reaction mixture is transferred via line 49 to filter 50. Pure phosphoric acid filtrate is removed via line 51 as product. The calcium sulfate is transferred via line 52 to dryer 53 and the calcium sulfate product is removed from the dryer via line 54.

When the process is operated to produce $CaHPO_4$ as product the $Ca(H_2PO_4)_2 \cdot H_2O$ is transferred via line 55 to heater 56. It is thermally dissociated in water from line 57.

The slurry passes via line 58 to filter 59. $H_3PO_4$ filtrate is removed via line 60 and the cake is transferred via line 61 to dryer 62. Product is removed via line 63.

EXAMPLE I

One liter of a solution, saturated at 195° F. and containing 40% $P_2O_5$ and 5% CaO, was cooled to 125° F. with agitation. Agitation was stopped and a 100 ml. portion of supernatant liquor containing suspended fines was decanted from the crystals of monocalcium phosphate. The decanted liquor was heated to 200° F. while adding $CaCO_3$ and wet process $H_3PO_4$ (30% $P_2O_5$) in amounts equivalent to 2.4 gm. CaO and 6.1 gm. $P_2O_5$ based on the 100 ml. portion. At 200° F., the $Ca(H_2PO_4)_2$ completely dissolved. The fortified portion was returned to the main body of solution. The mixed solution was cooled with agitation to 125° F. to crystallize the $Ca(H_2PO_4)_2 \cdot H_2O$.

Periodically, at 10 to 15 minute intervals, agitation was stopped and the coarse crystals were settled for 30 to 60 seconds. A 100 ml. portion of supernatant liquor, containing suspended fines, was decanted and the cycle was repeated.

Crystals of $Ca(H_2PO_4)_2 \cdot H_2O$ having a maximum dimension of 1 to 2 mm. were readily grown by this procedure at rates of 5 to 50 grams per hour per liter of liquor. The crystals of this size settled within 30 seconds after agitation was discontinued. The liquor was decanted from the crystals which were washed with water and dried.

The superior purity of the crystals with respect to F and Fe is shown by the comparative percentage compositions of the crystals and liquor in the following table:

|  | Theory for $Ca(H_2PO_4)_2 \cdot H_2O$ | Crystals | Mother liquor |
| --- | --- | --- | --- |
| CaO | 22.2 | 22.0 | 4.0 |
| $P_2O_5$ | 56.4 | 55.0 | 37.0 |
| F |  | 0.01 | 5.23 |
| Fe |  | 0.01 | 0.33 |

EXAMPLE II

In a process essentially that of the attached drawing, wet process phosphoric acid was fed to the first mix tank at the rate of 1450 tons per day. This feed contains 500 t./d. of $P_2O_5$. Phosphate rock was fed to the first mix tank at the rate of 210 t./d. This feed contains 67 t./d. of $P_2O_5$ and 79 t./d. of CaO. Wash water amounting to 50 t./d. was used in washing the crystals on the filter. A total of 304 t./d. of wet $Ca(H_2PO_4)_4 \cdot H_2O$ was produced, charged to the second mix tank, slurried with 50 t./d. of water and recrystallized in the second crystallizer. The wet $Ca(H_2PO_4)_2 \cdot H_2O$ product amounted to 304 t./d. and contained 200 t./d. of $P_2O_5$ and 79 t./d. of CaO. It had substantially the analysis of the product shown in Example I.

Purge acid out of the process amounted to 1116 t./d. It contained the balance of the $P_2O_5$ charged and substantially all the impurities charged with the impure acid and rock. It was transferred to the fertilizer plant.

In the phosphoric acid regeneration step, the 304 t./d. of wet $Ca(H_2PO_4)_2 \cdot H_2O$ was reacted with 138 t./d. of $H_2SO_4$ and 191 t./d. of $CaSO_4$ was removed by filtration. The pure phosphoric acid produced contained 200 t./d. of $P_2O_5$ and 164 t./d. of water (55% $P_2O_5$).

What is claimed is:

1. In a process for producing pure monocalcium phosphate from impure phosphoric acid by adding lime source material more alkaline than monocalcium phosphate to said impure phosphoric acid to form a first liquor containing dissolved monocalcium phosphate at an elevated temperature, cooling said first liquor to form a mixture of crystals of monocalcium phosphate and suspended impurities in a second liquor and separating said crystals of monocalcium phosphate from said second liquor; the improvement of simultaneously crystallizing said monocalcium phosphate in the form of coarse crystals having at least one dimension greater than 0.5 mm. and maintaining said suspended impurities in finely divided condition in said second liquor; elutriating hydraulically to separate said coarse crystals of monocalcium phosphate from said second liquor and from said finely divided impurities suspended in said second liquor, and recovering said coarse crystals of purified monocalcium phosphate.

2. The process as claimed in claim 1 wherein said purified monocalcium phosphate is hydrolyzed to produce purified dicalcium phosphate.

3. The process as claimed in claim 1 wherein said purified monocalcium phosphate is acidified with sulfuric acid to produce calcium sulfate and purified phosphoric acid and said calcium sulfate is separated from said purified phosphoric acid.

4. The process as claimed in claim 1 wherein said purified monocalcium phosphate is redissolved in recycled crystallizer liquor and recrystallized by repeating the process of claim 1.

References Cited

UNITED STATES PATENTS

| 1,902,648 | 1/1933 | Larsson | 23—109 |
| 2,121,208 | 1/1938 | Milligan | 23—109 |
| 2,135,475 | 11/1938 | Sebastian | 23—109 |

FOREIGN PATENTS 699,882  11/1953  Great Britain.

OSCAR R. VERTIZ, *Primary Examiner.*

L. A. MARSH, *Assistant Examiner.*